Feb. 20, 1923.
J. ICKENROTH.
HEADREST FOR MOTORISTS.
FILED FEB. 4, 1922.
1,445,689.
2 SHEETS—SHEET 1.
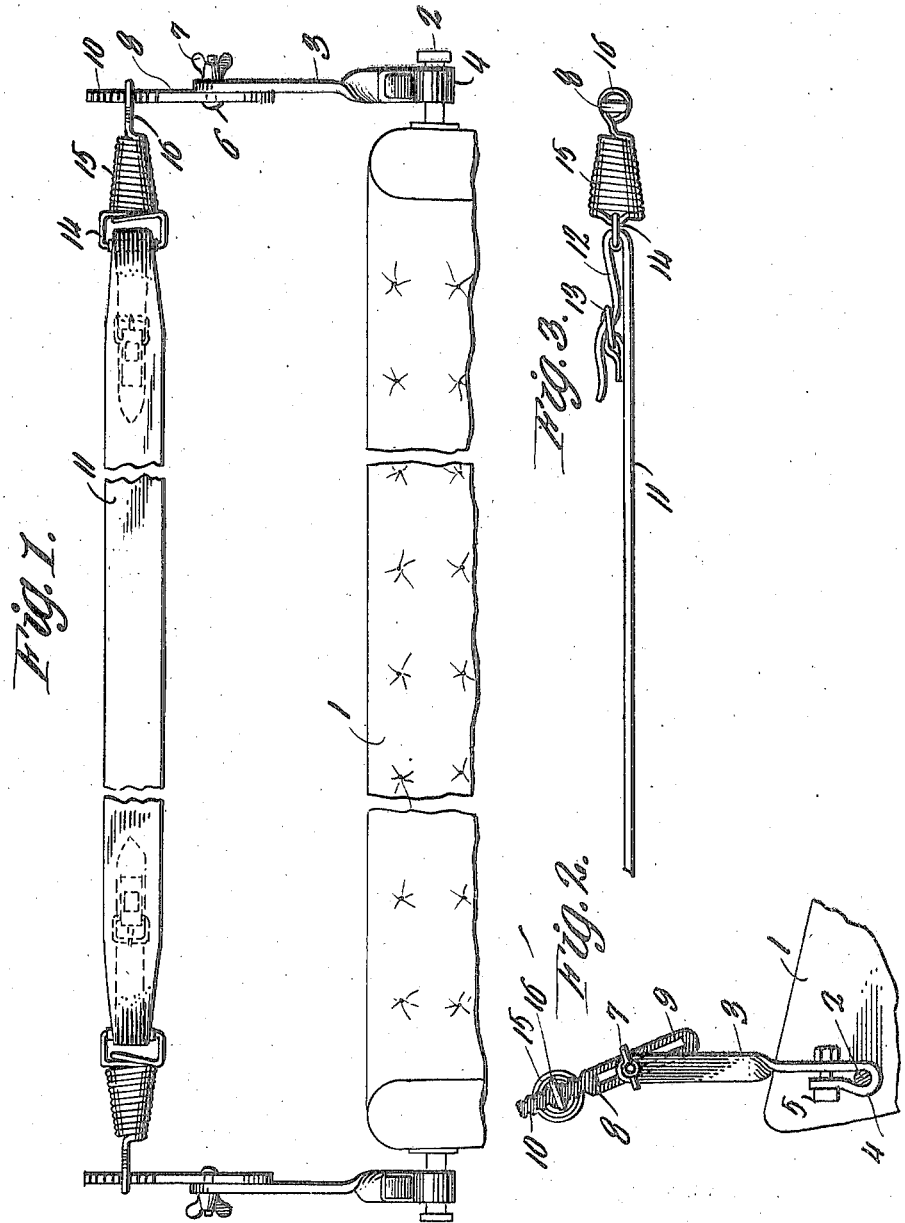
WITNESSES
JOHN ICKENROTH
Inventor
By Richard B. Owen
Attorney

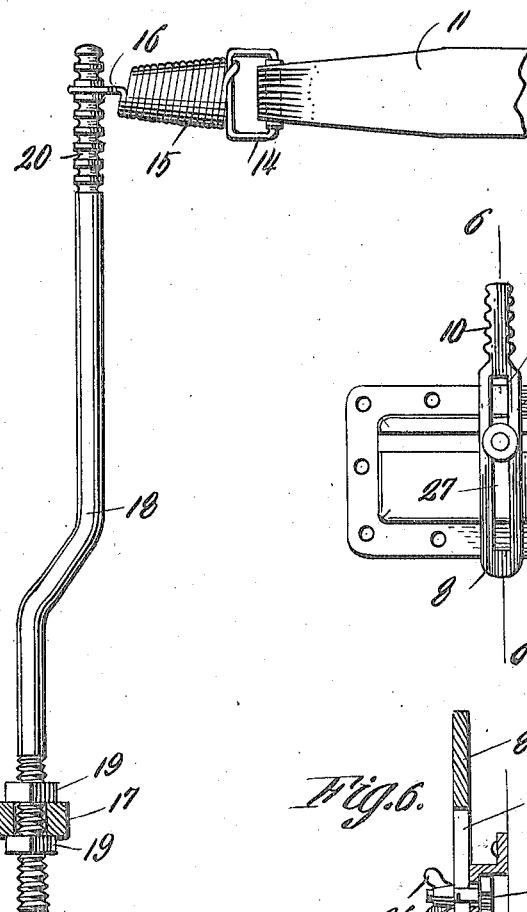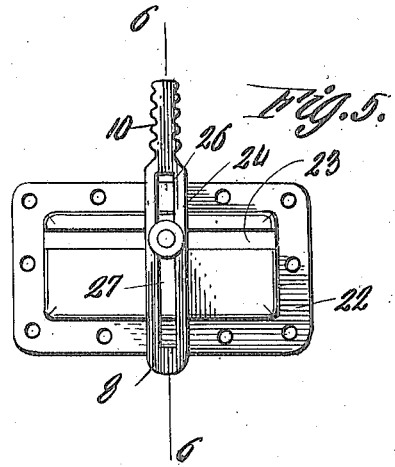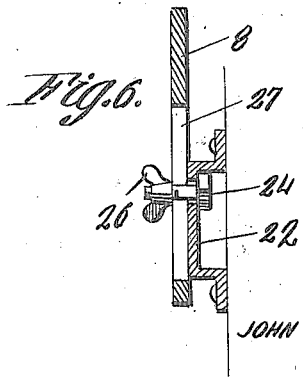

Patented Feb. 20, 1923.

1,445,689

UNITED STATES PATENT OFFICE.

JOHN ICKENROTH, OF RICHMOND HEIGHTS, MISSOURI.

HEADREST FOR MOTORISTS.

Application filed February 4, 1922. Serial No. 534,169.

*To all whom it may concern:*

Be it known that I, JOHN ICKENROTH, a citizen of the United States, residing at Richmond Heights, 1012 Yale Ave., in the county of St. Louis and State of Missouri, have invented certain new and useful Improvements in a Headrest for Motorists, which is designed especially to be used in conjunction with automobile seats, and of which the following is a specification.

This invention relates to a head rest which is designed especially to be used in conjunction with automobile seats and has for its principal object to provide simple and efficient means upon which the head may be rested by the passengers in the automobile.

Another important object of the invention is to provide a device of this nature which is adjustable to accommodate persons of different heights by a simple and efficient vertical adjustment.

A still further object of the invention is to provide adjusting means so as to place the head rest in various positions for accommodating the various positions which a passenger might desire to take.

With the above and numerous other objects in view as will appear as the description progresses, the invention resides in certain novel features of construction, and the combination and arrangement of parts as will be hereinafter more fully described and claimed.

In the drawing:—

Figure 1 is an elevation of one modification of the head rest showing the same attached to the upper portion of an automobile seat, Figure 2 is a side elevation of the device shown in Figure 1, Figure 3 is an edge view of the flexible member and one of its spring attaching devices, Figure 4 is a fragmentary elevation of another modification of the head rest, Figure 5 is a similar view of a still further modification of the holding means for the head rest, and Figure 6 is a section taken on the line 6—6 of Figure 5.

Referring to the drawing in detail and especially Figures 1 to 3 inclusive it will be seen that 1 represents a seat of any preferred construction having the lugs 2 extending from its sides. The brackets 3 are attached to the lugs 2 and include the clamp portions 4 which envelop the lugs 2 and are held in firm engagement therewith by means of the bolts 5. This bracket 3 is twisted so that its upper portion extends in a plane at right angles to its lower portion and the upper end thereof is apertured so as to receive the bolt 6 which has thereon a thumb nut 7. The bracket bar 8 is provided with the elongated slot 9 at its lower end which receives the bolt 6 whereby this bracket bar may be held in various adjusted positions in relation to the bracket 3. The upper end of the bracket bar 8 is provided with a plurality of annular grooves or notches 9. The head rest proper consists of a flexible member 11 which is provided at its ends with strap elements 12 engageable with the buckle 13. These strap elements 12 are adapted to engage the loops 14 of the springs 15 which are provided at their other ends with loops 16 for engaging the annular grooves or notches 10. It will, therefore, be readily seen that the flexible member 11 may be adjusted vertically in relation to the bracket bars 8 and that the bracket bars 8 may also be adjusted vertically in relation to the brackets 3 and may be in and out of alignment at various angles therewith as may be found desirable.

Referring to the modification disclosed in Figure 4 it will be seen that any suitable apertured bracket 17 is attached to the seat and a bracket bar 18 is passed through its aperture and held in place by the nuts 19 whereby the bracket bar may be adjusted vertically. The upper end of the bracket bar 18 is provided with the series of annular grooves or notches 20 for receiving the loops 16 of the spring 15. The remaining portion of the device will be the same as those described in connection with the previously described modifications.

Referring to the modification shown in Figure 5 it will be seen that a bracket 22 is provided having therein a horizontal slot 23 through which passes the bolt 24 being provided with a thumb nut 26. This bolt 24 also passes through a slot 27 provided in the bracket bar 8 which is provided with the annular notches or grooves 10 for receiving the loops 14 as is disclosed to advantage in Figure 1.

I have described my invention with some degree of particularity in connection with my preferred embodiment thereof but it is to be understood that numerous changes in form, and in the combination and arrangement of parts may be resorted to without departing from the spirit of the invention as hereinafter claimed.

Having thus described my invention what I claim as new is:—

In combination, a head rest, a pair of brackets for said head rest each of which consists of a bracket bar provided at its upper end with a series of annular notches, loops for engaging said notches, springs on said loops engaging the ends of said head rest, and means for attaching the bars to a seat in the manner and for the purpose specified.

In testimony whereof I affix my signature in presence of two witnesses.

JOHN ICKENROTH.

Witnesses:
  JOHN R. STUCKES,
  S. A. HORN.